April 17, 1934.                      J. D. FERRY                         1,955,360
                                  VEGETABLE SLICER
                               Filed Nov. 20, 1931             4 Sheets-Sheet 1

Inventor
Joseph D. Ferry

April 17, 1934.  J. D. FERRY  1,955,360
VEGETABLE SLICER
Filed Nov. 20, 1931   4 Sheets-Sheet 2

Inventor
Joseph D. Ferry
By
Attorney

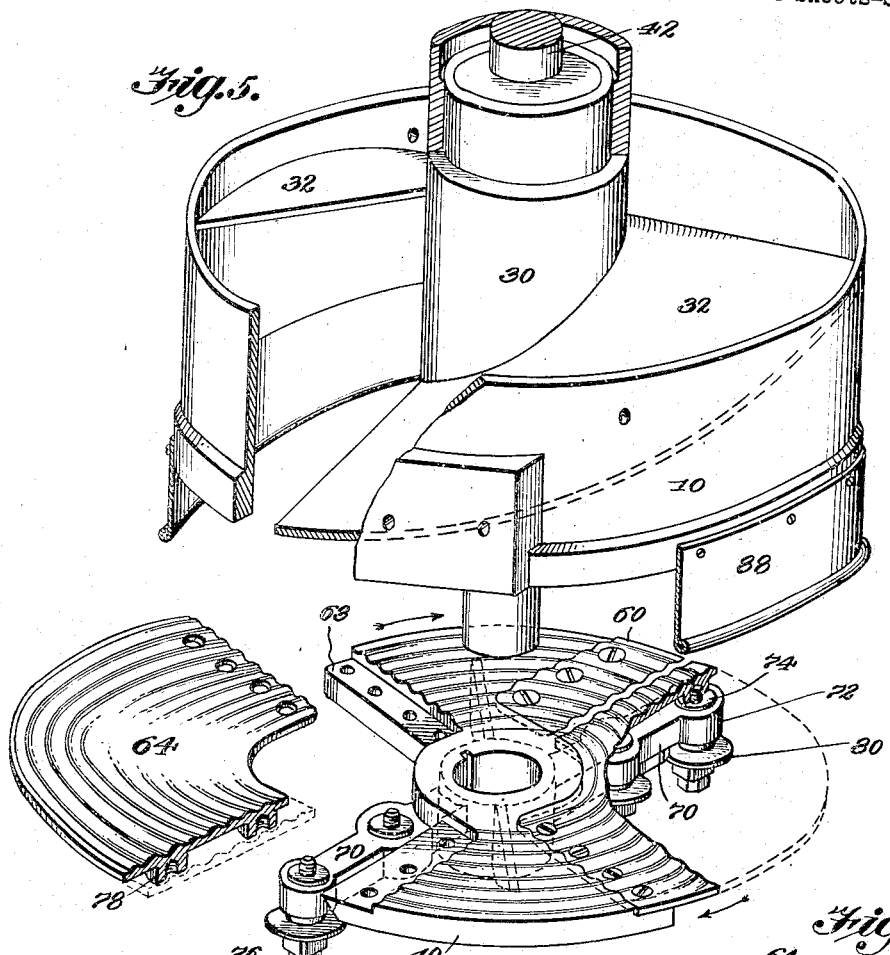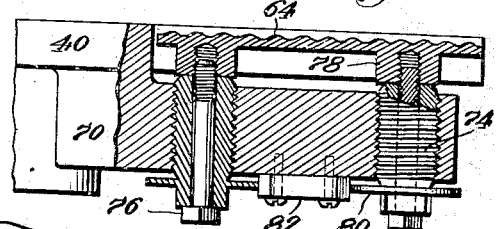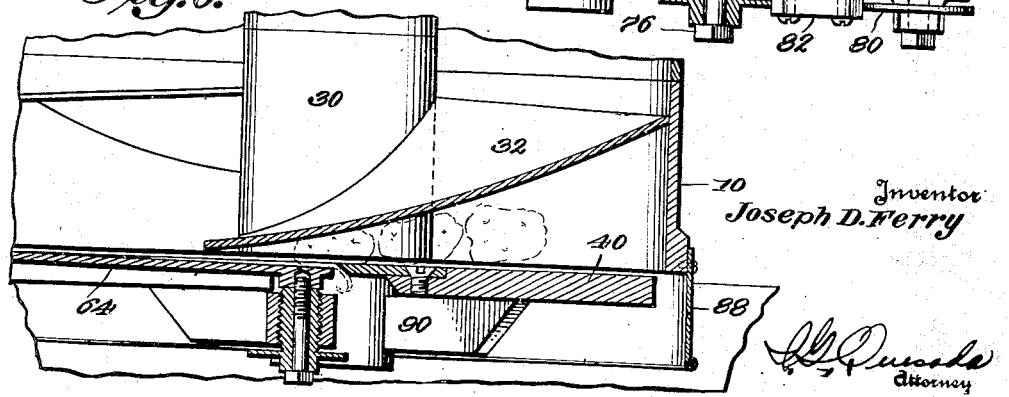

April 17, 1934.                    J. D. FERRY                    1,955,360
                              VEGETABLE SLICER
                            Filed Nov. 20, 1931          4 Sheets-Sheet 4
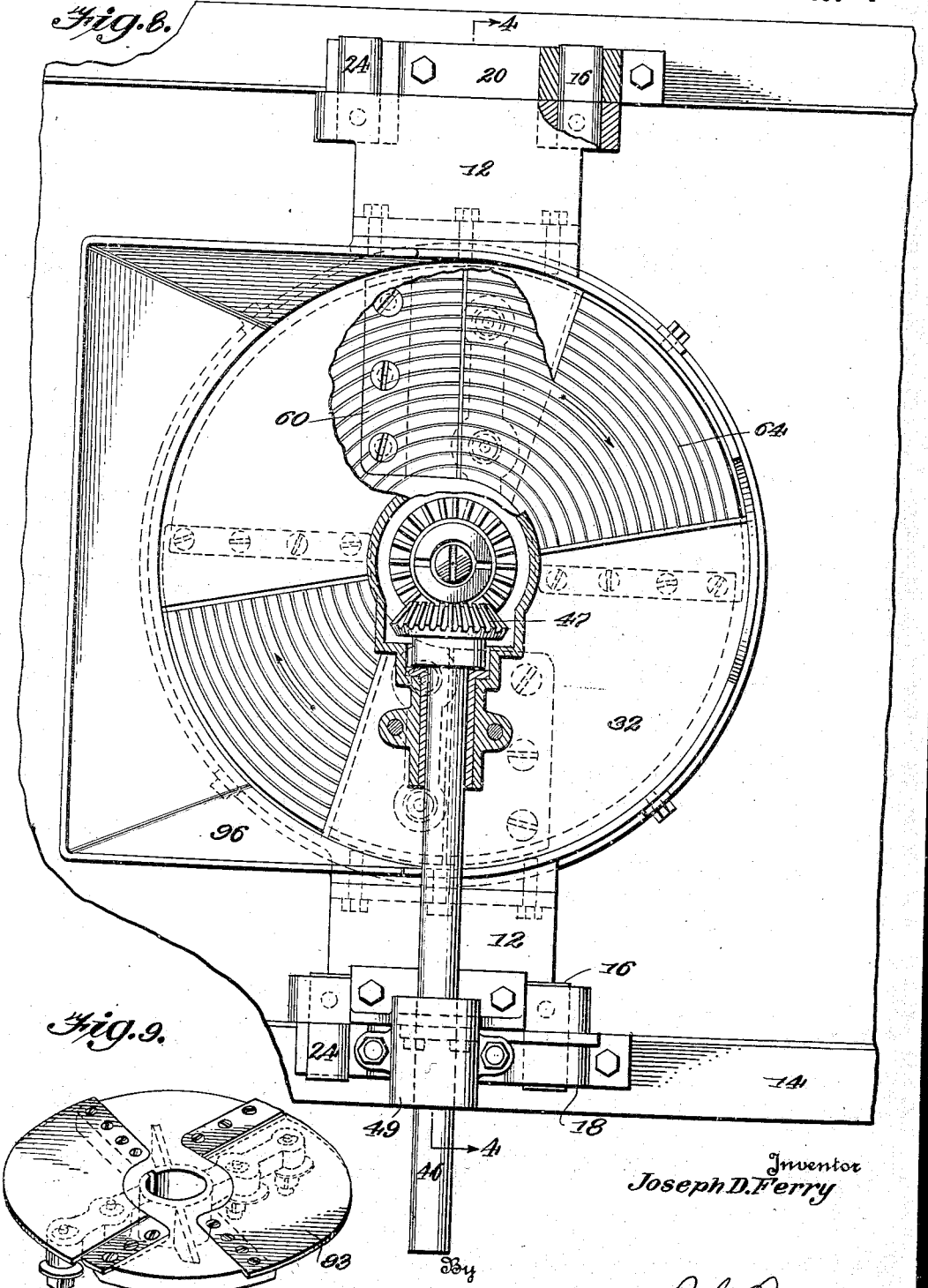
Inventor
Joseph D. Ferry Patented Apr. 17, 1934

1,955,360

UNITED STATES PATENT OFFICE 1,955,360

VEGETABLE SLICER

Joseph D. Ferry, Harrisburg, Pa.

Application November 20, 1931, Serial No. 576,407

10 Claims. (Cl. 146—124)

This invention relates to vegetable slicers, especially adapted for use in the commercial preparation of potato or Saratoga chips, although it will be seen that the invention is adaptable to other uses.

The vegetable slicer forming the subject of this application will be found to embody a rotor arranged in operative relation to a vegetable feeding hopper and having one or more blades rigidly fixed thereto, while the portions of the rotor immediately in advance of the blades are rendered adjustable to provide for the simple and accurate regulation of the thickness of the vegetable slices, this being in contrast to those vegetable slicers in which the blades themselves are adjustable and intersect the plane of the vegetable engaging surface of the rotor or other blade support, and are prone to lose their adjustment and which require considerable skill as well as patience to provide for extended use and the production of a slice or chip that is of a uniform thickness throughout.

The herein disclosed invention also embodies simple means by which ready access may be gained to the rotor for the purpose of providing for a change in the thickness of the slices being produced or for the purpose of inspection or repair, it being noted that the adjusting means for the rotor are arranged and located so that accurate regulation of the thickness of the potato chips may be accomplished without the exercise of unusual skill.

By way of further brief reference to the rotor and the accessibility of the same, it is pointed out that the rotor is held in place by the employment of a single set screw or similarly simple fastening device allowing a plain surfaced rotor to be easily and quickly removed and a corrugated rotor substituted or vice versa, the corrugated rotor being intended for use in the making of corrugated potato chips.

Another aim of the invention is to provide a vegetable slicer of the character specified, which is of highly simplified construction, efficient in use and relatively cheap to manufacture.

Other objects and advantages will be apparent during the course of the following description.

Figure 1:
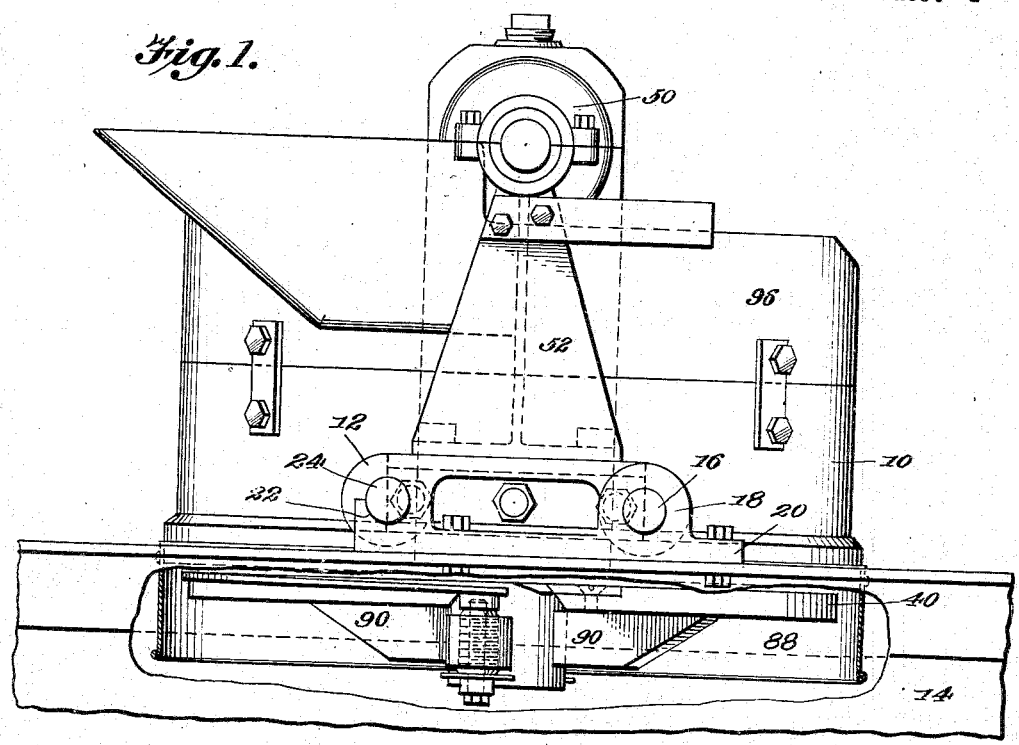
Figure 2:
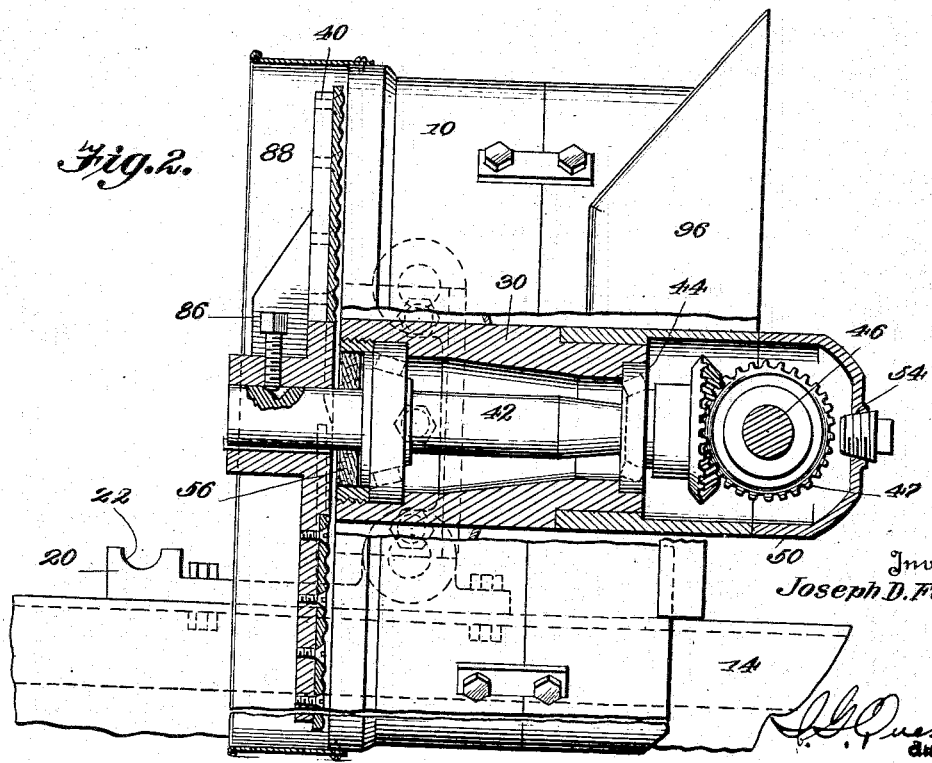
Figure 3:
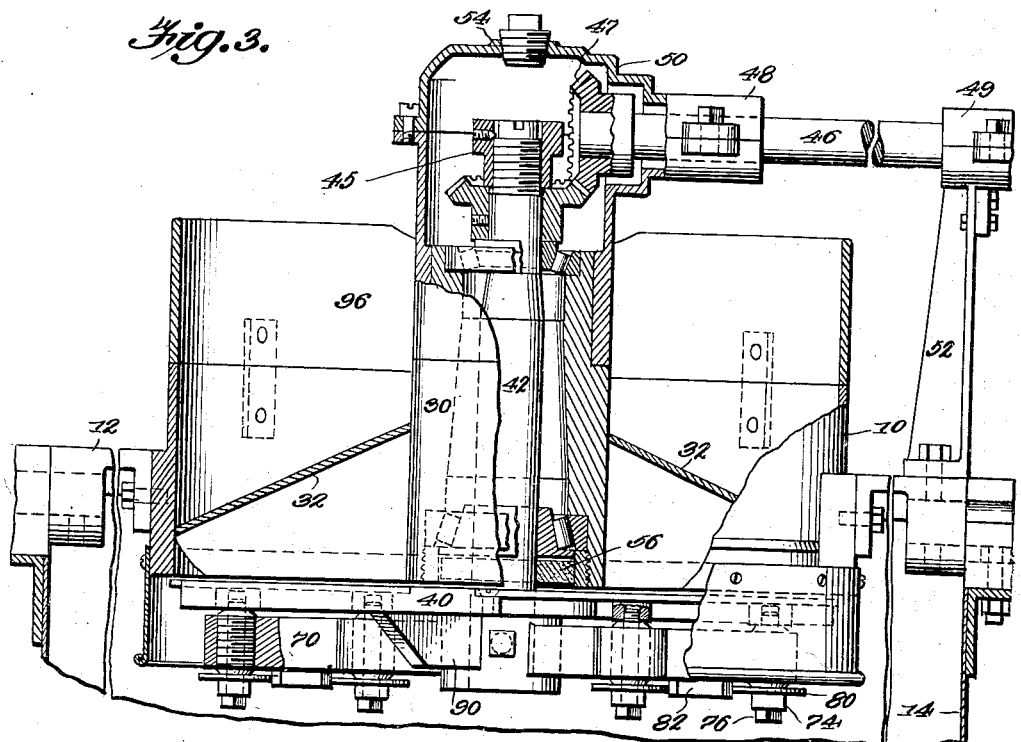
Figure 4:
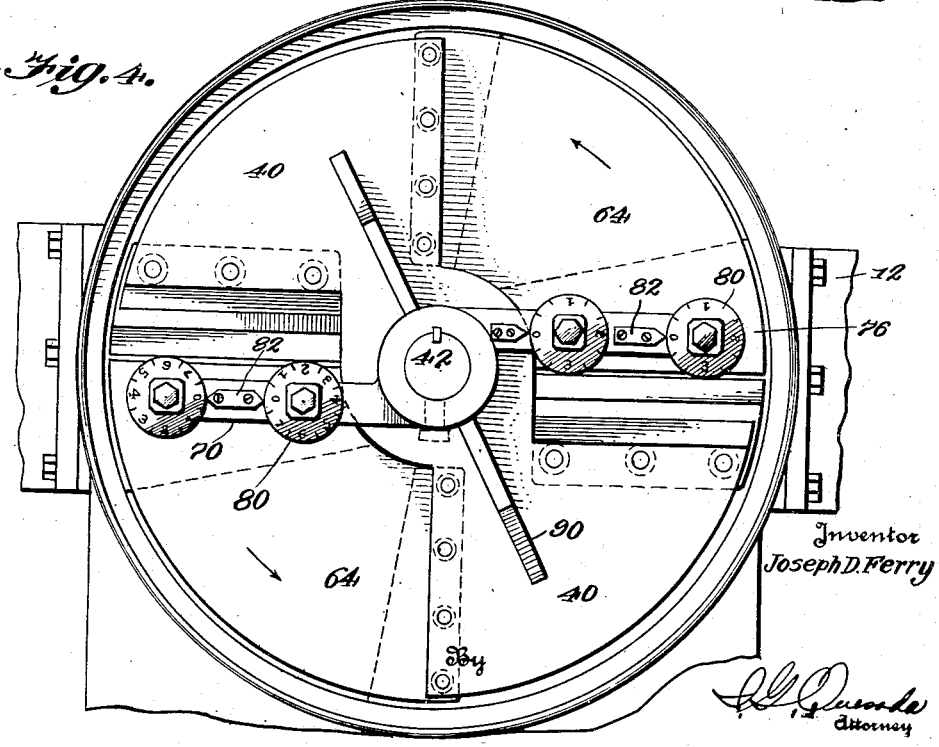

In the accompanying drawings, forming a part of this application and in which like numerals are employed to designate like parts throughout the same, Figure 1 is a side elevation of the improved vegetable slicer mounted on a portion of a potato chip making machine, a portion of the potato chip making machine being shown broken away to expose the rotor by which the potatoes are sliced, Figure 2 is a fragmentary side elevation of the improved slicer swung to an inoperative position to afford direct and full access to the rotor, the rotor and a portion of the supporting and motion transmitting mechanism therefor being shown in section, Figure 3 is a fragmentary vertical sectional view through the improved vegetable slicer, Figure 4 is a fragmentary bottom plan view of the improved vegetable slicer, Figure 5 is a fragmentary group perspective of the rotor and the hopper, Figure 6 is a vertical detailed sectional view through a portion of the rotor and the adjacent portion of the hopper, Figure 7 is a detailed sectional view illustrating the means by which the portions of the rotor immediately in advance of the cutting blades are depressed at angles to the plane of rotation of the rotor for presenting the cutting edges of the blades to the vegetable, Figure 8 is a fragmentary plan view of the improved vegetable slicer.

Figure 9 is a perspective on a reduced scale of a plain surfaced rotor.

In the drawings, the numeral 10 designates a hopper having oppositely located radial arms 12 detachably secured thereto and provided with means by which the hopper and the associated mechanism to be described may be connected to a support 14 such as a potato making machine. More specifically, the hopper might advantageously be located immediately above a chip washing tank forming a part of a potato making machine, but since this forms no part of the herein disclosed invention, no detailed illustration thereof appears.

As best shown in Figures 1 and 8 the radial arms 12 are provided with trunnions 16 rotatably extended through the ears 18 of brackets 20 to provide a means by which the hopper and associated mechanism may be conveniently swung from the upright position shown in Figure 1 to the horizontal position shown in Figure 2 and vice versa. The brackets 20 are shown to be secured to the upper portion of the support 14 of whatever nature the latter happens to be and the brackets are provided with semi-circular seats 22 for pins 24, the latter being somewhat similar in structure to the trunnions 16 and being extended in spaced parallel relation thereto. Clearly, with the trunnions 16 extended through the ears 18 and the stop pins 24 resting on the seats 22 the hopper and associated mechanism is held in the desired position for use.

On the other hand, with the hopper and associated parts swung to the position shown in Figure 2, ready access is gained to the rotor for any one of a number of purposes, all of which will appear as the description proceeds.

The hopper 10 is in the form of an annular body surrounding a centrally located hub 30 and having connection with the hub through the intervention of a pair of oppositely located vanes or pressure plates 32. The pressure plates have the inner and outer edges thereof welded or otherwise secured to the hub and the body of the hopper. It is shown in Figures 5 and 6 that the pressure plates or vanes 32 dip or descend in the direction of travel of the rotor located below and at the same time, the vanes are sloped downward toward the outer edges thereof. In other words, the pressure plates or vanes 32 are inclined circumferentially and radially and cooperate with the rotor below in the formation of gradually restricted pockets opening at the rear ends thereof for the reception of potatoes or other vegetables to be sliced and diminishing in height toward what might be said to be the forward ends thereof.

The downward inclination of the pressure plates or vanes 32 toward the outer edges thereof is to resist centrifugal force incident to the turning of the rotor below with the result that while the potatoes are being sliced the same are held against shifting. The pressure plates or vanes are of ogee formation.

The rotor is designated by the numeral 40 and as shown in Figure 5 is in the form of a disc keyed in any suitable manner to the motion transmitting shaft 42 which passes through the hub 30. Figure 2 illustrates that the shaft 42 is held in a central position in the hub 30 through the medium of bearings of any appropriate character and the upper portion of the shaft and the adjacent end of a second shaft 46 are provided with interlocking motion transmitting gears 47.

In Figure 3 it is illustrated that the nut 45 which is threaded on the upper portion of the shaft 42 has pressure relation with the gear 47 mounted on the shaft 42 so that by advancing the nut, wear is taken up on the bearings 44. In explaining this it is pointed out that advancement of the nut 45 will have the effect of raising or drawing up the cone of the lower bearing and depressing the cone of the upper bearing so that neatness of both bearings may be maintained, all by the adjustment of a single nut. Also, the nut 45 acts as a means to hold one of the gears 47 on the shaft 42.

Referring now to Figure 3, it will be seen that what might be said to be the drive shaft 46 is extended through and is supported by bearings 48 and 49, the bearing 48 being carried by the gear housing 50 while the bearing 49 is mounted on the upper end of a standard 52 on one of the radial arms 12. The drive shaft 46 has connection with a suitable source of power.

In carrying out the invention, the gear housing 50 may be provided with an opening 54 normally closed by a plug and providing a means by which a lubricant of a suitable consistency may be introduced into the housing and into the hub 30. A felt washer 56 provides a simple means by which the lubricant introduced into the gear housing 28 and the hub 30 is held against escape.

Referring now to Figure 5, it will be seen that the rotor embodies two oppositely located more or less segmental sections preferably formed in a single piece with the hub of the rotor. One radial edge portion of each of the segmental sections is shown to be abruptly depressed or stepped to form supporting seats for blades 60. Each of the blades is securely and positively held in place by fastening devices and has the upper surface and the cutting edge thereof flush with the vegetable contacting surface of the rotor. By stepping the rotor to form the blade seats, the blades are securely backed and the thrust on the blade fastening devices is thus reduced.

The other radial edge portion of each segmental section of the rotor is also stepped or slightly depressed as indicated at 63 to form seats for approach plates 64, the approach plates being of circumferential dimensions to fit between the segmental sections of the rotor with slight spaces between the approach plates and the blades. Screw bolts or the like provide a convenient means for securing the approach plates 64 to the relatively fixed portion of the rotor.

It will be seen that each arcuate approach plate 64 is anchored at what might be said to be the leading end or edge thereof and is free from positive connection at the inner and outer edges thereof with the body of the rotor so that the trailing edge or rear end thereof is free for adjustment with respect to the adjacent blade.

The material forming the arcuate plates 64 has an inherent flexibility sufficient to allow of the adjustment of the plates to bring about the production of potato slices of the desired thickness.

Referring now to the particular means by which the approach plates 64 may be adjusted with respect to the associated blades, attention is invited to Figures 3, 4, 5, 6 and 7 in which it is shown that the hub of the rotor is provided with oppositely directed nearly radial arms 70 underlying the trailing edges of the arcuate plates 64 and having spaced internally threaded bosses 72 through which sleeve nuts or adjusting elements 74 are threaded. As shown in Figure 7, the bores of the several sleeve nuts 74 are smooth for the free passage of cap screws 76, the forward portions of which are threaded into bosses 78 on the undersides of the approach plates 64. The rear portions of the cap screws are diametrically enlarged to form heads for engagement with the rear ends of the sleeve nuts 74. By this arrangement, backing up of the sleeve nuts 74 will depress the trailing edges of the approach plates 64 with respect to the associated blades. This, of course, affects an increase in the thickness of the slices produced. After adjustment of the sleeve nuts 74, the cap screws are advanced sufficiently to act as locking devices holding the bosses 78 in firm pressure contact with the forward ends of the sleeves. In this connection, it is noted that the cap screws 76 are not bottomed in the sockets in the bosses 78. On the contrary there is sufficient space between the threaded ends of the cap screws 76 and the inner ends of the sockets in the bosses to allow the cap screws to be advanced to bring about the desired pressure contact between the opposed surfaces of the bosses 78 and the sleeve nuts 74.

Of course, the range of adjustment of the trailing edges of the several approach plates 64 is slight, possibly not more than a matter of a few thousandths of an inch, because under ordinary operating conditions a greater range of adjustment is not required.

Figures 5 and 7 illustrate that the adjusting units for the approach plates engage the trailing edges of the approach plates at radially spaced points and preferably adjacent to the inner and outer edges thereof so that the approach plates may be uniformly adjusted from the inner to the outer edges thereof. That is to say, the arrangement of the adjusting units with respect to the approach plates provides for the fixing of gaps of uniform width throughout between the blades and the approach plates.

In further adverting to the adjustment unit, it is pointed out that the same provides for imparting to the approach or gauge plates 64 slight circumferential helical twists. This makes possible uniformity in the matter of space between the approach plates and the associated blades. That is to say, there is made possible a uniform space throughout between a particular blade and the associated approach plate from the inner to the outer end of such blade. By reason of this construction, vegetable slices of a uniform thickness are produced. The slices have the same thickness throughout and by reason of this a particular slice will be fried or cooked uniformly throughout with the same degree of crispness from edge to edge as distinguished from a slice of varying thickness, crisp at one edge portion and unnecessarily thick at the diametrically opposite edge portion.

Referring now to Figures 4 and 7, it will be seen that the rear portions of the adjusting sleeves 74 have annular dials 80 fixed thereon and graduated for cooperation with markers or fingers 82 in indicating the position of the several sleeve nuts. This provides for the co-extensive adjustment of the several sleeve nuts with the result that the adjustment of the rotor may be made without the exercise of unusual skill and with facility. In carrying out the invention, the markers 82 may be positioned between the indicating discs 80 in which case the same are oppositely pointed or there may be a separate marker for each dial, all of which is shown in Figure 4. In fact, any pointing means such as simple marks on the arms 70 may be employed for cooperation with the indicating discs, this being a matter that is entirely optional and within the skill of those acquainted with this art.

As previously stated, the rotor 40 is keyed on the lower portion of the shaft 42 and in addition is held in place by a single set screw 86 so that the rotor may be conveniently detached as a unit. This makes it possible to substitute a plain surfaced rotor 93 as shown in Figure 9, for the annularly corrugated one, shown in the other figures, it being apparent that the presence of the corrugations bring about the production of corrugated potato chips.

When a corrugated rotor is employed, the blades and the approach plates thereof are also corrugated and the pressure exerted on the potatoes by the pressure plates 32 will cause the lower portions of the potatoes to take the form of the surface of the rotor so that upon being engaged by the blades corrugated chips will result.

As shown in Figures 1 and 3, an annular apron 88 is suspended from the lower portion of the hopper 10 to prevent the potato chips from flying outward by centrifugal force. Also, in Figures 1 and 3, it is illustrated that suitable reinforcing ribs 90 extend from the hub of the rotor to the undersides of the body of the rotor to strengthen and reinforce the same, it being understood, of course, that the hub of the rotor and the oppositely located segments thereof forming the body of the rotor are, along with the reinforcing ribs preferably cast in a single piece.

To prepare the improved slicer for use, the same is swung back to the inoperative position shown in Figure 2, to expose the rotor and the blades thereof so that the approach plates 64 may be adjusted for the production of chips of uniform thickness. After the adjustment of the members 74 and 76 to incline the approach plates 64 in the manner previously explained, the slicer is swung to the position shown in Figure 1 and when the potatoes have been introduced into the hopper, the rotor and more particularly, the blades thereof will cut the potatoes into slices of uniform thickness. Of course, the rotor is started before the introduction of potatoes into the hopper. Incidentally, the hopper body 10 may be provided with a suitable extension 96 increasing the capacity of the hopper and it will be seen that one side of the extension is provided with an inclined inlet portion for the introduction of potatoes into the hopper.

It is to be understood that the form of invention herewith shown and described is to be taken merely as a preferred example of the same and that such minor changes in arrangement and construction of parts may be made as will remain within the spirit of the invention and the scope of what is claimed.

Having thus described my invention, what is claimed is:

1. In a vegetable slicer, a movable element having a blade, a flexible plate carried by the movable element in advance of said blade, an arm in operative relation to said flexible plate, a sleeve nut carried by said arm and having means to engage said plate, and a cap screw extended freely through said sleeve nut and having threaded engagement with said plate, said cap screw being provided with a diametrical enlargement engaging a portion of said sleeve nut to lock the flexible plate in an adjusted position.

2. In a machine for slicing potatoes, a body and a central hub, a plurality of tilted arcuate pressure plates between the hub and the body and being of ogee formation, and a cutter rotatably mounted beneath said pressure plates and cooperating therewith in the formation of potato receiving pockets, said pressure plates being inclined downwardly transversely from the inner to the outer edges thereof.

3. In a machine of the character described, a body and a hub within the body, and a plurality of segmental pressure plates between the body and the hub and being inclined downwardly transversely from the inner to the outer edges thereof, said pressure plates also being bowed downward in the direction of the circumference of the same to present convex surfaces to the potatoes beneath the same.

4. In a potato slicing apparatus, an annular body, a hub within the annular body, and a pressure plate confined between the hub and the body, a disk beneath said plate and cooperating therewith and said body and the hub in the formation of an arcuate pocket adapted for the reception of potatoes, the space between the pressure plate and the disk being diminished radially and uniformly in the direction of the annular body thereby diminishing the height of the pocket from the inner to the outer radial side thereof.

5. In a vegetable slicer, a movable element having a blade, a flexible plate carried by the movable element and having one edge thereof adjacent to said blade, a support in operative relation to said flexible plate, a sleeve nut carried by said support and having means to engage said plate, and a screw extended through said sleeve nut and having threaded engagement with said plate, said screw being provided with means engaging a portion of said sleeve nut to lock the flexible plate in an adjusted position in pressure relation to said sleeve nut.

6. In a vegetable slicer, a rotor having a blade fixed thereto, said rotor being provided immediately in advance of the blade with a flexible arcuate approach plate secured rigidly at the leading edge thereof to the rotor and being free at the inner and outer edges thereof, separate abutment elements adjacent the trailing edge of the approach plate at spaced points for engagement by spaced portions of the approach plate, and locking devices securing the trailing edge portion of the approach plate in pressure engagement with the abutment elements, said spaced abutment elements being independently and selectively adjustable to establish a uniform space throughout between the blade and the approach plate.

7. In a vegetable slicer, a rotor having a blade rigidly secured thereto, said rotor being provided immediately in advance of the blade with a flexible arcuate circumferentialy extending approach plate rigidly secured to the rotor and being free at the inner and outer peripheral edges thereof, and means for imparting a slight circumferential helical twist to the approach plate to uniformly space the trailing end of the plate from the inner to the outer end of the blade and embodying radially spaced separate adjusting devices having operative connection with the trailing portion of said arcuate approach plate at radially spaced points, each of said adjusting devices being independently adjustable for twisting the approach plate circumferentially.

8. In a vegetable slicer, a rotor having a blade rigidly secured thereto, said rotor being provided in advance of the blade with a flexible arcuate circumferentially extending approach plate free at the inner and outer peripheral edges thereof, and means for imparting a slight circumferential twist to the approach plate to space the trailing end of the approach plate uniformly throughout from the blade.

9. In a vegetable slicer, a rotor having a blade rigidly secured thereto, said rotor being provided immediately in advance of the blade with a flexible arcuate circumferentially extending approach plate rigidly secured to the rotor and being free at the inner and outer peripheral edges thereof, and means for imparting a slight circumferential helical twist to the approach plate to uniformly space the trailing end of the plate from the inner to the outer end of the blade and embodying radially spaced separate adjusting devices having operative connection with the trailing portion of said arcuate approach plate at radially spaced points, each of said adjusting devices being independently adjustable for twisting the approach plate circumferentially, there being abutment elements associated with said adjusting devices for pressure engagement by the trailing edge portion of said arcuate approach plate.

10. In a vegetable slicer, a rotor having a blade rigidly secured thereto, said rotor being provided immediately in advance of the blade with a flexible arcuate circumferentially extending approach plate rigidly secured to the rotor and being free at the inner and outer peripheral edges thereof, and means for imparting a slight circumferential helical twist to the approach plate to uniformly space the trailing end of the plate from the inner to the outer end of the blade and embodying radially spaced separate adjusting devices having operative connection with the trailing portion of said arcuate approach plate at radially spaced points, each of said adjusting devices being independently adjustable for twisting the approach plate circumferentially, there being abutment elements associated with said adjusting devices for pressure engagement by the trailing edge portion of said arcuate approach plate, an arm underlying said approach plate and supporting said abutment elements, and cooperating members carried by said arms and said abutment elements to indicate the relative positions of the abutment elements.

JOSEPH D. FERRY.